(12) United States Patent
Chang

(10) Patent No.: US 9,998,725 B2
(45) Date of Patent: Jun. 12, 2018

(54) APPARATUS AND METHOD FOR GENERATING DEPTH INFORMATION

(71) Applicant: ELECTRONICS AND TELECOMMUNICATIONS RESEARCH INSTITUTE, Daejeon (KR)

(72) Inventor: Ji-Ho Chang, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 20 days.

(21) Appl. No.: 15/208,151

(22) Filed: Jul. 12, 2016

(65) Prior Publication Data

US 2017/0098307 A1  Apr. 6, 2017

(30) Foreign Application Priority Data

Oct. 5, 2015 (KR) .................. 10-2015-0139711

(51) Int. Cl.
*G06K 9/00* (2006.01)
*H04N 13/00* (2018.01)
(Continued)

(52) U.S. Cl.
CPC ....... *H04N 13/0022* (2013.01); *G06T 3/4007* (2013.01); *G06T 7/593* (2017.01);
(Continued)

(58) Field of Classification Search
None
See application file for complete search history.

(56) References Cited

U.S. PATENT DOCUMENTS

| 8,189,943 B2 | 5/2012 | Yea et al. |
| 2008/0267494 A1 | 10/2008 | Cohen et al. |

(Continued)

FOREIGN PATENT DOCUMENTS

| EP | 2 466 901 A2 | 6/2012 |
| GB | 2523149 A * | 2/2014 |

(Continued)

OTHER PUBLICATIONS

Dongseok Lee et al., "Real-time moving object tracking and distance measurement system using stereo camera", Journal of Broadcast Engineers, 2009, pp. 366-377, vol. 14, No. 3.

(Continued)

*Primary Examiner* — Manav Seth
*Assistant Examiner* — David Perlman

(57) ABSTRACT

An apparatus for generating depth information of an example may include an image downsizer configured to downsize an input stereo image by a predetermined magnification to generate a downsized stereo image; a rawcost calculator configured to calculate rawcosts for the downsized stereo image; a mapper configured to map the rawcosts to the input stereo image; an interpolator configured to perform interpolation and cost aggregation for the rawcosts; and a depth information generator configured to calculate an optimal disparity for each pixel of the input stereo image by referring to the rawcosts.

18 Claims, 6 Drawing Sheets

(51) Int. Cl.
*G06T 3/40* (2006.01)
*G06T 7/593* (2017.01)

(52) U.S. Cl.
CPC ............ *H04N 13/0029* (2013.01); *G06T 2207/10008* (2013.01); *G06T 2207/20016* (2013.01); *H04N 2013/0081* (2013.01)

(56) References Cited

U.S. PATENT DOCUMENTS

| | | |
|---|---|---|
| 2012/0008857 A1* | 1/2012 | Choi ............ G06T 7/0022 382/154 |
| 2012/0237114 A1 | 9/2012 | Park et al. |
| 2013/0215234 A1 | 8/2013 | Lim et al. |
| 2017/0083787 A1* | 3/2017 | Najafi Shoushtari ........... G06K 9/6201 |

FOREIGN PATENT DOCUMENTS

| | | |
|---|---|---|
| KR | 10-2012-0105764 A | 9/2012 |
| KR | 10-2013-0094626 A | 8/2013 |

OTHER PUBLICATIONS

Jiho Chang et al., "Efficient stereo matching by dropping disparity levels for FPGA implementation", Proceedings of the 2nd International Conference of Machine Vision and Machine Learning, Jul. 13-14, 2015, pp. 341-1-341-5, No. 341, Barcelona, Spain.

* cited by examiner

APPARATUS AND METHOD FOR GENERATING DEPTH INFORMATION

CROSS REFERENCE TO RELATED APPLICATION

This application claims the benefit under 35 U.S.C. § 119(a) of Korean Patent Application No. 10-2015-0139711 filed on Oct. 5, 2015 in the Korean Intellectual Property Office, the disclosure of which is incorporated herein by reference in its entirety.

BACKGROUND

1. Field

The following description relates to a technology for generating depth information, and more particularly to a technology for generating depth information by referring to a stereo image.

2. Description of Related Art

Two or more cameras, like the human eyes, can be used simultaneously to take stereo pairs or stereo photos in order to measure depth of and distance to an object. A correspondence point in a particular position in an image taken by one camera can be taken in a different position in another image taken by another camera, depending on distance disparity of stereo cameras. Distance information between a camera and an object can be obtained by using binocular disparity (or disparity) and trigonometry. When two cameras aligned in parallel are used, the optimal value of binocular disparity becomes smaller as it is farther from the camera, and that becomes greater as it is closer. Even though two cameras are not aligned in parallel, 3-dimensional coordinate including depth information of a correspondence point can be calculated from binocular disparity of the correspondence point when relative distance and direction information between two cameras are accurate. A technology for obtaining depth information from two or more cameras is called as stereo vision. A high resolution stereo matching algorithm is not easy to implement in real time because of the amount of calculation required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In this disclosure, an apparatus and a method for generating depth information which generates depth information of an image through change in size of an inputted image and a limited disparity search range, are provided.

According to one general aspect, an apparatus for generating depth information includes an image downsizer configured to downsize an input stereo image by a predetermined magnification to generate a downsized stereo image; a rawcost calculator configured to calculate rawcosts for the downsized stereo image; a mapper configured to map the rawcosts to the input stereo image; an interpolator configured to perform interpolation and cost aggregation for the rawcosts; and a depth information generator configured to calculate an optimal disparity for each pixel of the input stereo image by referring to the rawcosts and generate depth information corresponding to the optimal disparity.

The rawcost calculator may calculate rawcosts of target pixels of the downsized stereo image from absolute difference, squared difference or relative gradient between a target pixel of one side image of the downsized stereo image and a pixel within a disparity search range from a target pixel of another side image of the downsized stereo image, and determine rawcosts for pixels to be a predetermined cost, which are not present within the disparity search range, among the pixels present within a maximum disparity range corresponding to resolution from the target pixel of another side image.

The rawcost calculator may update a disparity search range for a next frame of each pixel to a range between a value obtained by subtracting a predetermined updated value of the optimal disparity from the optimal disparity for each pixel of the input stereo image and a value obtained by adding the predetermined updated value of the optimal disparity and the optimal disparity for each pixel of the input stereo image.

The rawcost calculator may update a predetermined cost for each pixel of the input stereo image to a maximum value among or an average of the rawcosts of the pixels of the input stereo image.

The image downsizer may extract a plurality of pixels by sampling the input stereo image and generate the downsized stereo image including the extracted pixels. The mapper may perform mapping rawcosts of the pixels of the downsized stereo image to the sampled pixels of the input stereo image.

The interpolator may perform interpolation between rawcosts of the pixels in a cost volume including the rawcosts mapped to the input stereo image; or interpolation between rawcosts of the pixels in the cost volume; interpolation between rawcosts corresponding to the same width and disparity in the cost volume; and interpolation between rawcosts corresponding to the same height and disparity in the cost volume.

The interpolator may interpolate the rawcosts through linear interpolation or bicubic interpolation, and perform cost aggregation through a support weight filtering process for the interpolated rawcosts.

The interpolator may perform the support weight filtering process twice.

According to another general aspect, a method for generating depth information in which an apparatus for generating depth information generates depth information, includes generating a downsized stereo image by downsizing an input stereo image by a predetermined magnification; calculating rawcosts for the downsized stereo image; mapping the rawcosts to the input stereo image; performing interpolation for the rawcosts; performing cost aggregation for the rawcosts; calculating optimal disparity for each pixel of the input stereo image by referring to the rawcosts; and generating depth information corresponding to the optimal disparity.

The calculating rawcosts for the downsized stereo image may include: calculating rawcosts of target pixels of the downsized stereo image from absolute difference, squared difference or relative gradient between a target pixel of one side image of the downsized stereo image and a pixel within a disparity search range from a target pixel of another side image of the downsized stereo image; and determining rawcosts for pixels based on a predetermined cost, which are not present within the disparity search range, among the pixels present within a maximum disparity range corresponding to resolution from the target pixel of another side image.

The method for generating depth information may further include updating a disparity search range for a next frame of each pixel to a range between a value obtained by subtracting a predetermined updated value of the optimal disparity from the optimal disparity for each pixel of the input stereo image and a value obtained by adding the predetermined updated value of the optimal disparity and the optimal disparity for each pixel of the input stereo image.

The method for generating depth information may further include updating a predetermined cost for the pixels of the input stereo image to a maximum value among or an average of the rawcosts of the pixels of the input stereo image.

The generating a downsized stereo image by downsizing an input stereo image by a predetermined magnification may include extracting a plurality of pixels by sampling the input stereo image and generating the downsized stereo image including the extracted pixels, and the mapping the rawcosts to the input stereo image may include performing mapping rawcosts of the pixels of the downsized stereo image to the sampled pixels of input stereo image.

The performing interpolation for the rawcost may include performing interpolation between rawcosts of the pixels in a cost volume including the rawcosts mapped to the input stereo image; or interpolation between rawcosts of the pixels in the cost volume; interpolation between rawcosts corresponding to the same width and disparity in the cost volume; and interpolation between rawcosts corresponding to the same height and disparity in the cost volume.

The performing interpolation for the rawcost may include interpolating the rawcosts through linear interpolation or bicubic interpolation, and the performing cost aggregation for the rawcosts may include performing cost aggregation through a support weight filtering process for the interpolated rawcost.

The performing cost aggregation for the rawcosts may include performing the support weight filtering process twice.

The apparatus and the method for generating depth information may reduce computation quantities required for generating depth information.

The apparatus and the method for generating depth information may allow generating depth information with less error through reduced computation quantities.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
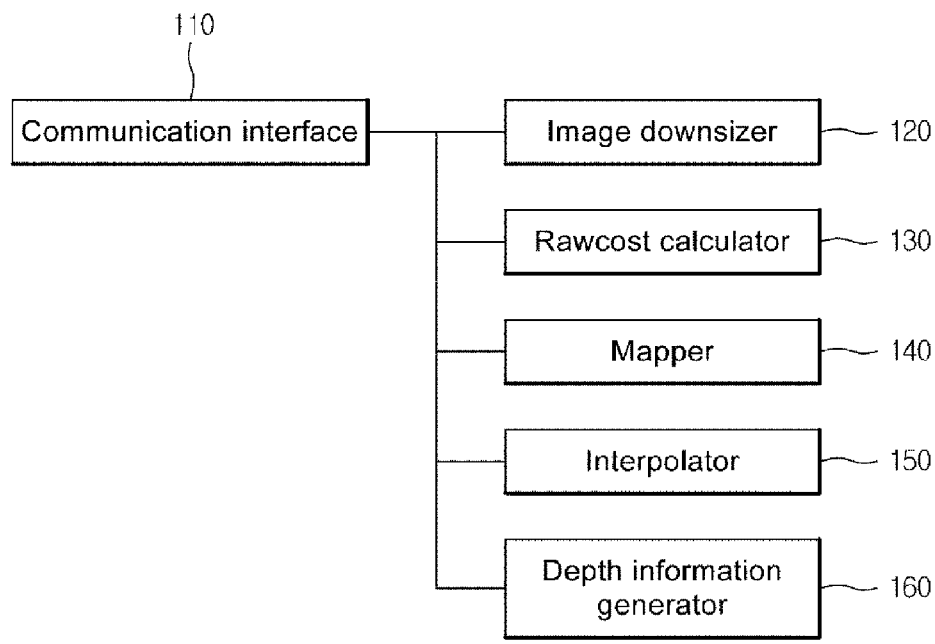
FIG. 1 is a diagram illustrating an example of an apparatus for generating depth information.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Unless otherwise defined, all terms, including technical terms and scientific terms, used herein have the same meaning as how they are generally understood by those of ordinary skill in the art to which the present disclosure pertains. Any term that is defined in a general dictionary shall be construed to have the same meaning in the context of the relevant art, and, unless otherwise defined explicitly, shall not be interpreted to have an idealistic or excessively formalistic meaning.

Identical or corresponding elements will be given the same reference numerals, regardless of the figure number, and any redundant description of the identical or corresponding elements will not be repeated. Throughout the description of the present disclosure, when describing a certain relevant conventional technology is determined to evade the correspondence point of the present disclosure, the pertinent detailed description will be omitted. Terms such as "first", "second", and the like can be used in describing various elements, but the above elements shall not be restricted to the above terms. The above terms are used only to distinguish one element from the other. In the accompanying drawings, some elements may be exaggerated, omitted or briefly illustrated, and the dimensions of the elements do not necessarily reflect the actual dimensions of these elements.

Hereinafter, certain embodiments of the present disclosure will be described in detail with reference to the accompanying drawings.

Figure 2:
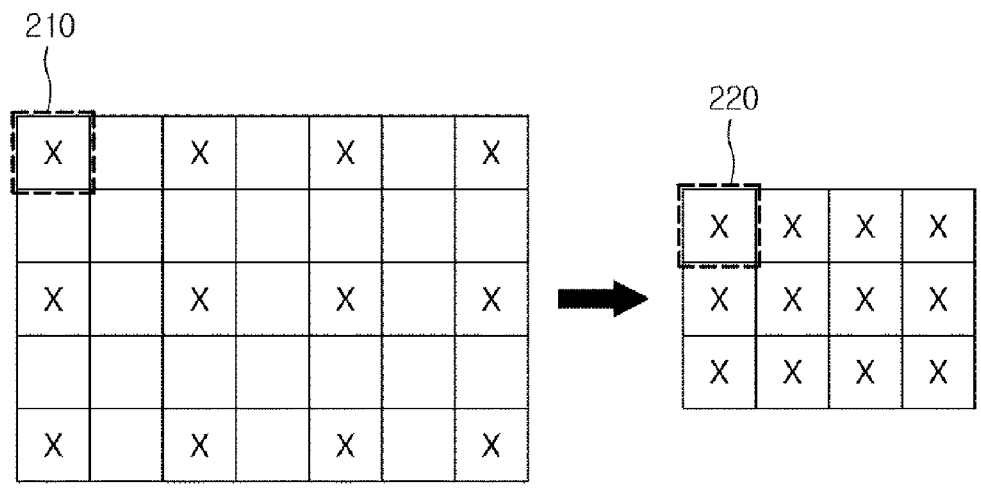
FIG. 2 is a diagram illustrating an example of a process for downsizing a stereo image using an example of an apparatus for generating depth information.
Figure 3:
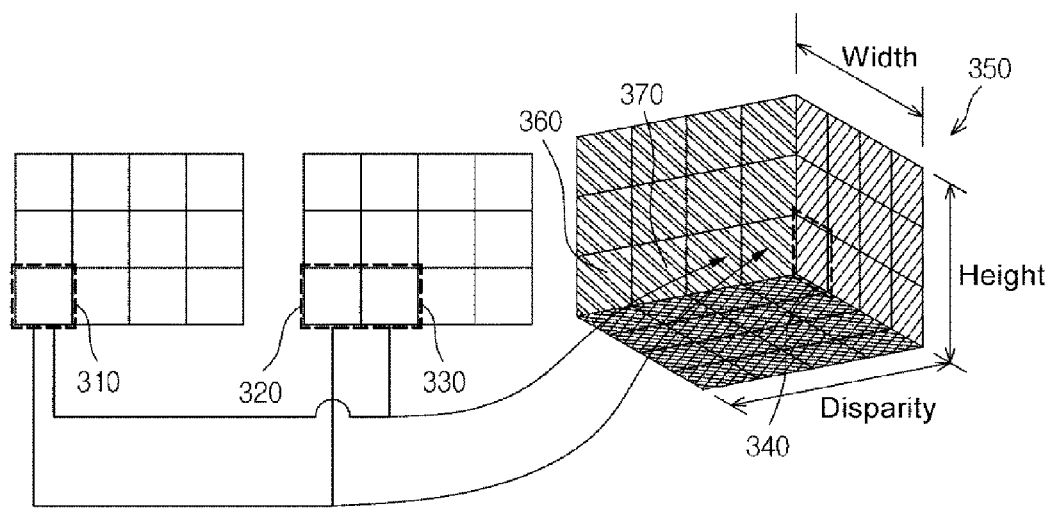
FIG. 3 is a diagram illustrating an example of cost volume generated by an example of an apparatus for generating depth information.
Figure 4:
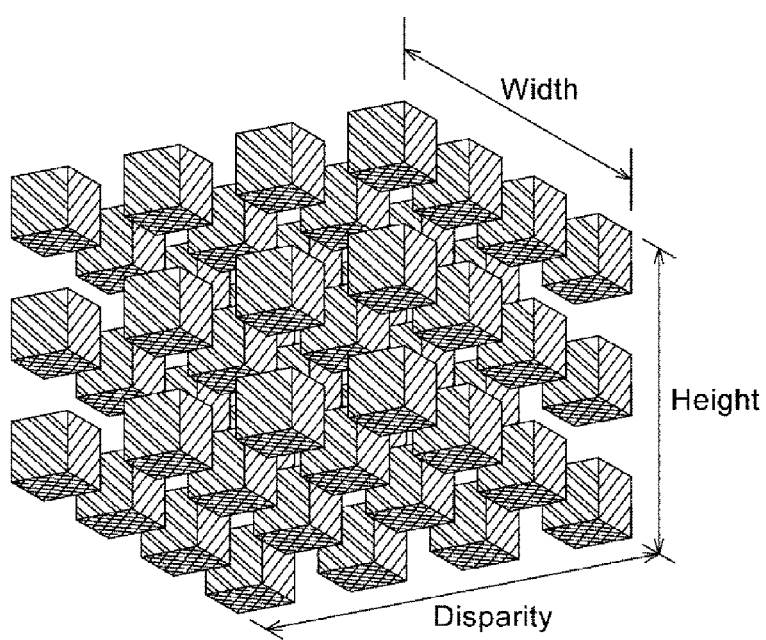
FIG. 4 is a diagram illustrating an example of cost volume mapped to an input stereo image by an example of an apparatus for generating depth information.
Figure 5:
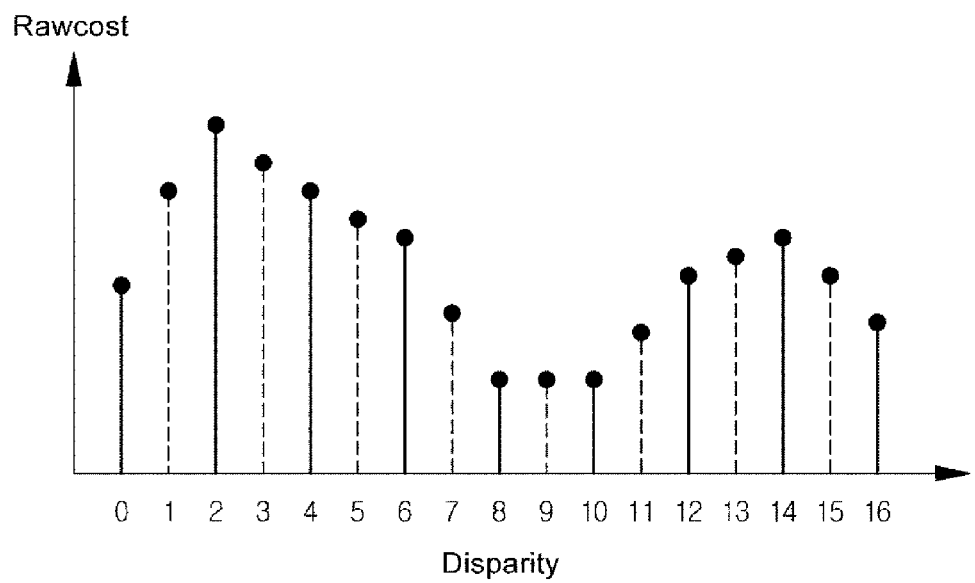
FIG. 5 is a diagram illustrating an example of a process for interpolating rawcosts by an example of an apparatus for generating depth information.
Figure 6:
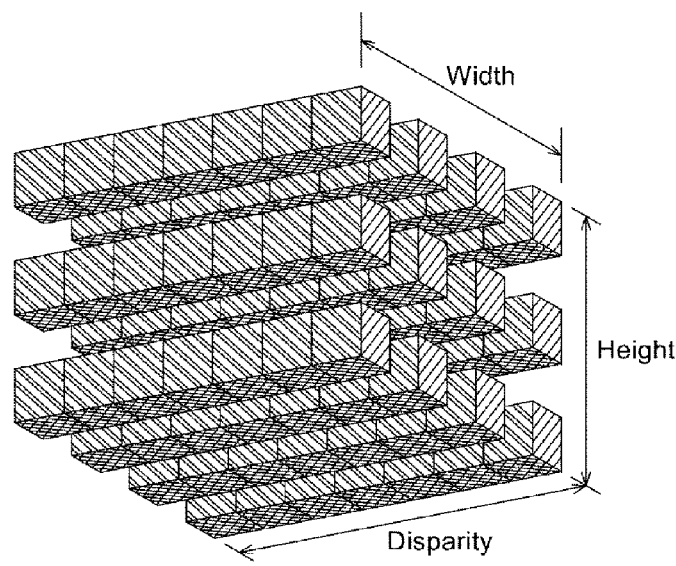
FIG. 6 is a diagram illustrating an example of cost volume when an example of an apparatus for generating depth information interpolates between rawcosts of pixels.
Figure 7:
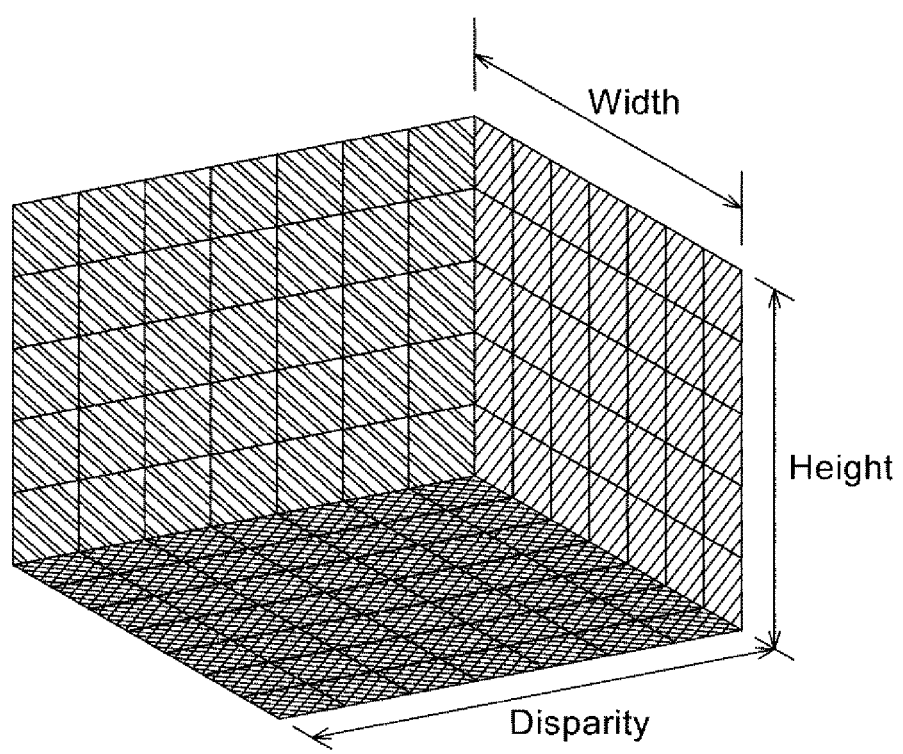
FIG. 7 is a diagram illustrating an example of cost volume generated through cost aggregation by an example of an apparatus for generating depth information.

FIG. 1 is a diagram illustrating an example of an apparatus for generating depth information, FIG. 2 is a diagram illustrating an example of a process for downsizing a stereo image using an example of an apparatus for generating depth information, FIG. 3 is a diagram illustrating an example of cost volume generated by an example of an apparatus for generating depth information, FIG. 4 is a diagram illustrating an example of cost volume mapped to an input stereo image by an example of an apparatus for generating depth information, FIG. 5 is a diagram illustrating an example of a process for interpolating rawcosts by an example of an apparatus for generating depth information, FIG. 6 is a diagram illustrating an example of cost volume when an example of an apparatus for generating depth information interpolates between rawcosts of pixels, FIG. 7 is a diagram illustrating an example of cost volume generated through cost aggregation by an example of an apparatus for generating depth information.

Referring to FIG. 1, an apparatus for generating depth information according to an example may include a communication interface 110, an image downsizer 120, a rawcost calculator 130, a mapper 140, an interpolator 150, and a depth information generator 160.

The communication interface 110 may receive a stereo image through a predetermined protocol and an external device such as a camera, a storage medium and the like. The stereo image may include left and right images generated by using a stereo camera. Hereinafter, the stereo image received by the communication interface 110 may be referred to as an input stereo image.

The image downsizer 120 may downsize size of the stereo image by a predetermined magnification to generate a downsized image (hereinafter, referred to as 'downsized stereo image'). For example, the apparatus for generating depth information may downsize size of left and right images with a resolution of 1280×720 to 640×360. The apparatus for generating depth information may downsize size of the stereo image through a sampling method. As seen in FIG. 2, the apparatus for generating depth information may sample a pixel (the upper left pixel in FIG. 2, 210) corresponding to a predetermined position among pixels of the left and right images which corresponds to blocks of 2×2 size, and provide an image including the sampled pixels to the downsized left and right images. In addition, the apparatus for generating depth information may perform a process for generating a downsized stereo image by using other methods such as bilinear, bicubic and the like in addition to the sampling method.

The rawcost calculator 130 may estimate rawcosts of pixels of the downsized stereo image. The rawcost calculator 130 may select a target pixel of one side image (for example, a right image of the downsized stereo image) and a target pixel of another side image (for example, a left image of the downsized stereo image). Here, the coordinate of the target pixel in one side image may be identical to that of the target pixel in another side image. The rawcost calculator 130 may estimate rawcosts for the target pixels using similarity between a target pixel of one side image and a pixel within a disparity search range from a target pixel of another side image.

The similarity of the target pixel may be estimated using Absolute difference (AD), squared difference (SD), census transform (CT) or relative gradient (RG), etc. between the target pixel of one side image and the target pixel of another side image. The disparity search range may be determined in a previous process or may be a range of pixels in one-axis direction (for example, in the horizontal direction) of the downsized stereo image which is first predetermined as default. For example, when the disparity search range is 35-67, the apparatus for generating depth information may compute rawcosts using AD, SD, CT or RG of the target pixel in a coordinate (60, 90) of one side image and the pixels in coordinates (60+35, 90)-(60+67, 90) of another side image. The rawcost calculator 130 may select one pixel of which rawcost is not computed among the pixels of one side image of the downsized stereo image as the target pixel and repeat a process for computing rawcost for the corresponding target pixel till it computes rawcosts of all pixels of one side image. The rawcost calculator 130 may generate cost volume including the obtained rawcosts. The cost volume may be data structure including rawcosts between pixels of one side image and pixels in the disparity search range of another side image at the position corresponding to height and width of each pixel in one side image and disparity between the pixel of one side image and pixels in the disparity search range of another side image in a spatial system of coordinates with two axes of height and width of the stereo image and one axis of disparity between one side image and another side image. Referring to FIG. 3, for example, the rawcost calculator 130 may include rawcosts between a target pixel of one side image 310 and pixels 320, 330 in a disparity search range of another side image into a cost volume 350. The rawcost calculator 130 may include rawcosts of the pixel 310 and the pixel 320 of FIG. 3 into a region corresponding to the position 340 of a target pixel and disparity between the pixel 310 and the pixel 320 in the cost volume. The rawcost calculator 130 may include rawcosts of the pixel 310 and the pixel 330 of FIG. 3 into a region corresponding to the position 340 of a target pixel and disparity between the pixel 310 and the pixel 330 in the cost volume.

Furthermore, the rawcost calculator 130 may compute rawcosts for pixels which are not present within the disparity search range among pixels within the maximum disparity range corresponding to resolution from a target pixel of another side image in a previous process or assign a predetermined cost, which is first predetermined as default, as rawcost. The rawcost calculator 130 may generate cost volume in which a predetermined cost is assigned for positions (for example, 360 and 370 in FIG. 3) of which rawcosts are not computed in the cost volume. Thus, the rawcost calculator 130 may include rawcosts for all positions in the cost volume of the downsized stereo image.

The mapper 140 may map the rawcosts to the input stereo image. For example, the mapper 140 may map the rawcost of each pixel (for example, 220 of FIG. 2) of the downsized stereo image to the sampled pixel (210 of FIG. 2). The mapper 140 may map each pixel of the input stereo image of which rawcost is not mapped to '0'. When a method for generating the downsized stereo image is not the sampling method, it is apparent that a mapping method may be modified to correspond thereto. For example, when the downsized stereo image is generated by utilizing bilinear, bicubic or the like, the mapper 140 may map rawcosts only for pixels in the positions according to a predetermined rule and rawcosts for the rest pixels (for example, pixels which are not indicated as x in FIG. 2) to '0'. For example, as shown in FIG. 2, when the rawcost of the downsized stereo image is mapped to the rawcosts of the stereo image corresponding to the original size, the pixels of which rawcosts are not computed (which are not indicated as x) may be present.

As the disparity range increases according to the original resolution, the number of rawcosts to be computed for pixels may increase. However, since only rawcosts of the downsized stereo image are computed in the previous process, a part of rawcosts of the input stereo image according to the original resolution may be unknown. As shown in FIG. 4, the cost volume of the input stereo image may include the positions of which rawcosts are determined as 0 or are not determined in addition to the position of which rawcosts are computed by the rawcost calculator 130 (hatched positions in FIG. 4).

The interpolator 150 may interpolate the rawcosts of the pixels which are not 0 and then estimate rawcosts which are not computed.

The interpolator 150 may interpolate each rawcost mapped to the input stereo image. For example, the interpolator 150 may interpolate rawcosts of the pixels in the cost volume which corresponds to the same coordinate with the pixels through linear interpolation as shown in FIG. 5. The solid lines indicate the rawcosts computed by the rawcost calculator 130 and the dotted lines do the rawcosts which are not computed but estimated through the linear interpolation. FIG. 5 only illustrates an example of the linear interpolation. However, the linear interpolation may be performed when the interpolator 150 has computed the rawcosts using AD, while the bicubic interpolation may be performed when it has computed the rawcosts using SD or CT. The interpolator 150 may generate cost volume including rawcosts of all disparities for the pixels of which rawcosts are computed by the rawcost calculator 130 as shown in FIG. 6. The cost volume of FIG. 6 may include rawcosts for the hatched positions.

Here, the interpolator 150 may additionally perform the interpolation between rawcosts corresponding to the same height and disparity and the interpolation between rawcosts corresponding to the same width and disparity in the cost volume. When it is set for the interpolator 150 to additionally perform the interpolation, the mapper 140 may not map rawcosts of the pixels of the input stereo image, which are not computed, to 0.

The interpolator 150 may perform cost aggregation only for the rawcosts mapped to the input stereo image. The interpolator 150 may perform cost aggregation using a support weight filtering method known in the art such as domain transform, information permeability filtering and the like. The interpolator 150 may perform cost aggregation once or more. For example, the interpolator 150 may perform the support weight filtering method twice. Edges may be preserved better at the second cost aggregation compared to the first one. The interpolator 150 may interpolate the rawcosts mapped to 0 in the cost volume of the input stereo image to be similar to neighboring rawcosts. When rawcosts of all positions in the cost volume are determined in the previous interpolation, the interpolator 150 may also adjust neighboring rawcosts in the cost volume to be similar between each other to show a shape of an object in the input stereo image. Thus, the interpolator 150 may generate the interpolator 150 including rawcosts of all positions (hatched positions) through interpolation and cost aggregation as shown in FIG. 7. The apparatus for generating depth information according to an example allows estimating rawcosts of the input stereo image even though rawcosts of the downsized stereo image are computed to reduce computational complexity.

The depth information generator 160 may calculate optimal disparity of each pixel of the input stereo image to generate depth information corresponding to the optimal disparity. For example, the apparatus for generating depth information may calculate the optimal disparity through WTA (winner-takes-all), DP (dynamic programming), BP (belief propagation), graph-cut or the like which are known in the art. The apparatus for generating depth information may generate depth information based on trigonometry by referring to the optimal disparity. The depth information generator 160 may generate a disparity image which is an image including the optimal disparity of each pixel. The depth information generator 160 may output the depth information to an external device through the communication interface 110.

The rawcost calculator 130 may update a disparity search range for a next frame of each pixel to a range between a value obtained by subtracting a predetermined updated value of the optimal disparity from the optimal disparity for each pixel of the input stereo image and a value obtained by adding the predetermined updated value of the optimal disparity and the optimal disparity for each pixel of the input stereo image. For example, the apparatus for generating depth information may predetermine an updated value for the range of the optimal disparity as shown in Table 1 below. Here, it is apparent that the range of the optimal disparity and the updated value may be modified based on an implementation method of the apparatus for generating depth information.

TABLE 1

| Range of the optimal disparity | Updated value |
| --- | --- |
| 0-32 | 16 |
| 33-63 | 32 |
| 64-127 | 63 |

When the optimal disparity of a pixel is 50, the apparatus for generating depth information may update a disparity search range of the corresponding pixel to (50-32)-(50+32).

The rawcost calculator 130 may also update the disparity search range for the pixel corresponding to an occlusion range among pixels in the input stereo image to from 0 to the maximum disparity or set rawcost of the pixel corresponding to an occlusion range of a next frame to 0. This means setting rawcost of the corresponding pixel to 0 in the process for computing rawcost for a next frame.

The rawcost calculator 130 may set the maximum value or an average of rawcosts of the pixels in the input stereo image as a predetermined cost of the corresponding pixel.

A method for generating depth information using the apparatus for generating depth information described above will be explained in detail with reference to FIG. 8.

Figure 8:
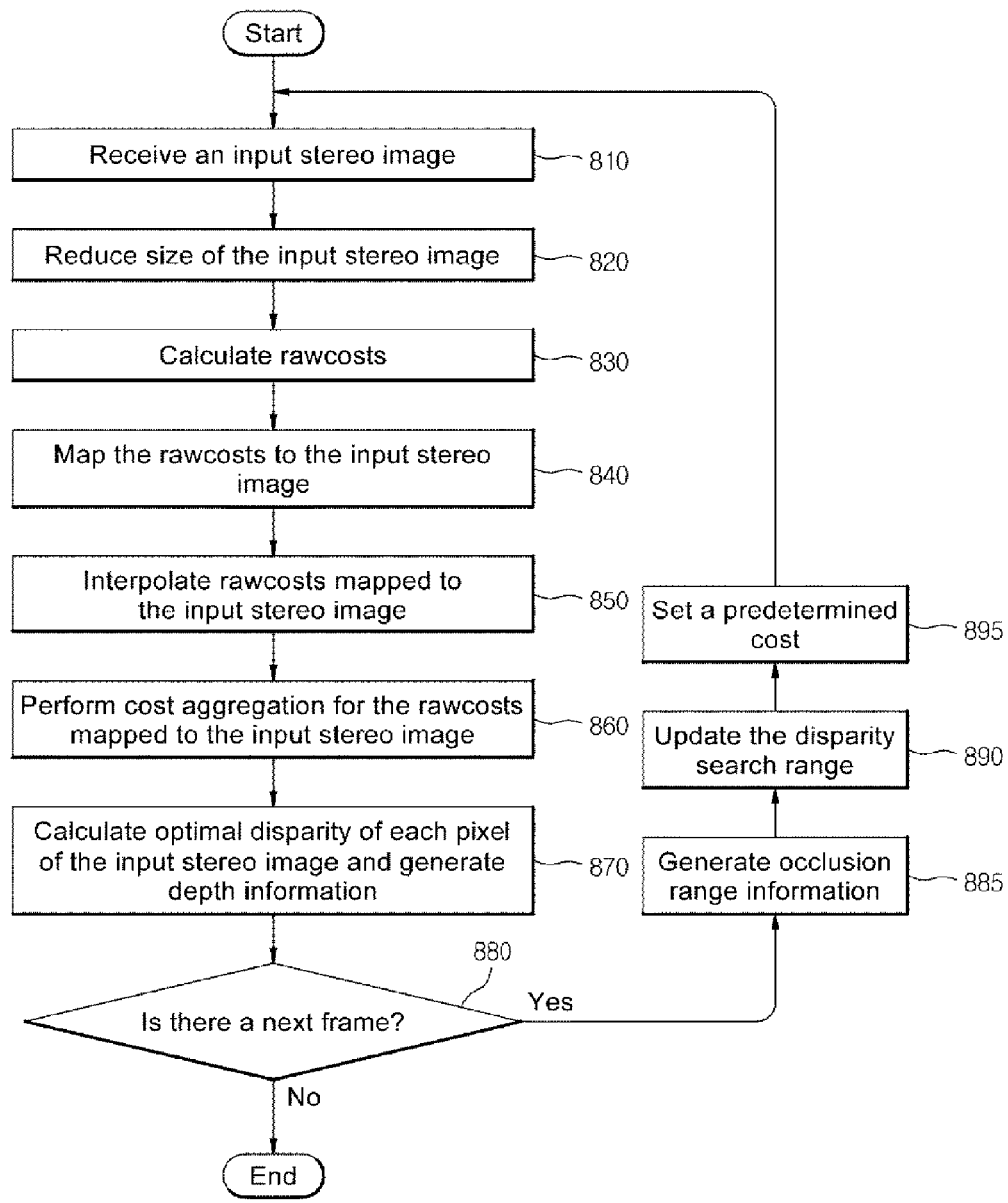
FIG. 8 is a flowchart illustrating an example of a method for generating depth information by an example of an apparatus for generating depth information.

FIG. 8 is a flowchart illustrating an example of a method for generating depth information by an example of an apparatus for generating depth information. The method to be explained below is performed through each units of the apparatus for generating depth information. However, an object of each process will be called as apparatus for generating depth information for concise and clear description.

Referring to FIG. 8, in Step 810, the apparatus for generating depth information may receive an input stereo image from an external device.

In Step 820, the apparatus for generating depth information may reduce size of the input stereo image by a predetermined magnification to generate a downsized stereo image. For example, as shown in FIG. 2, the apparatus for generating depth information may sample a pixel at a predetermined position, for example 210 of the upper left pixel in FIG. 2, among pixels of left and right images in blocks of 2×2 size and provide downsized left and right images from the image including the sampled pixels.

In Step 830, the apparatus for generating depth information may compute rawcosts of pixels in the downsized stereo image. Here, the apparatus for generating depth information may compute rawcosts of pixels within a disparity search range from a target pixel of one side image (for example, a right image of the downsized stereo image) and a target pixel (for example, a left image of the downsized stereo image) of another side image.

The apparatus for generating depth information may compute rawcosts of target pixels using similarity of the pixels in the disparity search range based on the target pixel of one side image and the target pixel of another side image. Here, the apparatus for generating depth information may generate a cost volume 350 including the rawcosts of to target pixels as shown in FIG. 3. The similarity of the target pixels may be provided using absolute difference (AD), squared difference (SD), census transform (CT) or relative gradient (RG), etc. between the target pixel of one side image and the target pixel of another side image. In addition, the apparatus for generating depth information may compute rawcosts of pixels, which are not present within the disparity search range, among the pixels within the maximum disparity range corresponding to resolution from the target pixel of another side image in a previous process or from a predetermined cost which is first set as default. Thus, the apparatus for generating depth information may generate the cost volume of pixels in the downsized stereo image including rawcosts with as many as the number of pixels in the maximum disparity range.

In Step 840, the apparatus for generating depth information may map the rawcosts to the input stereo image. For example, the apparatus for generating depth information may map the rawcost of each pixel (for example, 220 of FIG. 2) of the downsized stereo image to the sampled pixel (210 of FIG. 2) of the input stereo image. The apparatus for generating depth information may map pixels of the input stereo image, of which rawcosts are not mapped, to '0'.

When a method for generating the downsized stereo image is not the sampling method in Step 820, it is apparent that a mapping method in Step 840 may be modified to correspond thereto. For example, when the downsized stereo image is generated by utilizing bilinear, bicubic or the like, the apparatus for generating depth information may map rawcosts only for pixels in the positions according to a predetermined rule and map rawcosts for the rest pixels to '0'.

In Step 850, the apparatus for generating depth information may interpolate the rawcosts mapped to the input stereo image. For example, the apparatus for generating depth information may interpolate the rawcosts of the pixels as shown in FIG. 5. The solid lines indicate the rawcosts computed in Step 830 and the dotted lines do the rawcosts which are not computed but estimated through the linear interpolation. FIG. 5 only illustrates an example of the linear interpolation. However, the apparatus for generating depth information may be implemented to perform the linear interpolation when the apparatus for generating depth information has computed the rawcosts using AD in Step 830, while it may be to perform the bicubic interpolation when it has computed the rawcosts using SD or CT in Step 830. Thus, the apparatus for generating depth information may generate cost volume including rawcosts of the pixels in the maximum disparity which are mapped to not '0' as shown in FIG. 6.

In Step 860, the apparatus for generating depth information may perform cost aggregation for the rawcosts mapped to the input stereo image. The apparatus for generating depth information may perform cost aggregation using a support weight filtering method known in the art such as domain transform, information permeability filtering and the like.

The apparatus for generating depth information may perform cost aggregation once or more. For example, the apparatus for generating depth information may perform the support weight filtering method twice to preserve edges better at the second cost aggregation compared to the first one.

In Step 870, the apparatus for generating depth information may calculate optimal disparity of each pixel of the input stereo image by referring to the rawcosts. For example, the apparatus for generating depth information may calculate the optimal disparity through WTA (winner-takes-all), DP (dynamic programming), BP (belief propagation), graph-cut or the like which are known in the art. WTA is a method for selecting the disparity in minimum aggregated cost or in maximum one. The apparatus for generating depth information may generate depth information based on trigonometry by referring to the optimal disparity. The apparatus for generating depth information may generate a disparity image which is an image including the optimal disparity of each pixel.

In Step 880, the apparatus for generating depth information may determine whether there is a next frame of the input stereo image.

When it is determined there is a next frame of the input stereo image in Step 880, the apparatus for generating depth information may generate occlusion range information indicating occlusion region of the disparity image in Step 885. Here, the apparatus for generating depth information may generate occlusion range information indicating occlusion region of the disparity image using a left-right consistency check method known in the art.

In Step 890, the apparatus for generating depth information may update the disparity search range for the next frame from that of the present frame. The apparatus for generating depth information may update the disparity search range for a next frame of each pixel to a range between a value obtained by subtracting a predetermined updated value of the optimal disparity from the optimal disparity for each pixel of the input stereo image and a value obtained by adding the predetermined updated value of the optimal disparity and the optimal disparity for each pixel of the input stereo image.

The apparatus for generating depth information may update the disparity search range for the pixel corresponding to an occlusion range among pixels in the input stereo image to from 0 to the maximum disparity or set rawcost of the pixel corresponding to an occlusion range of a next frame to 0 (when the Step 830 is performed for the next frame, the rawcost of the corresponding pixel may be set to 0).

In Step 895, the apparatus for generating depth information may set the maximum value or an average of rawcosts of the pixels in the input stereo image as a predetermined cost of the corresponding pixel. The apparatus for generating depth information may repeat the process from Step 810 for the next frame of the input stereo image.

When it is determined there is no next frame of the input stereo image in Step 880, the apparatus for generating depth information may complete the process for generating depth information.

Figure 9:
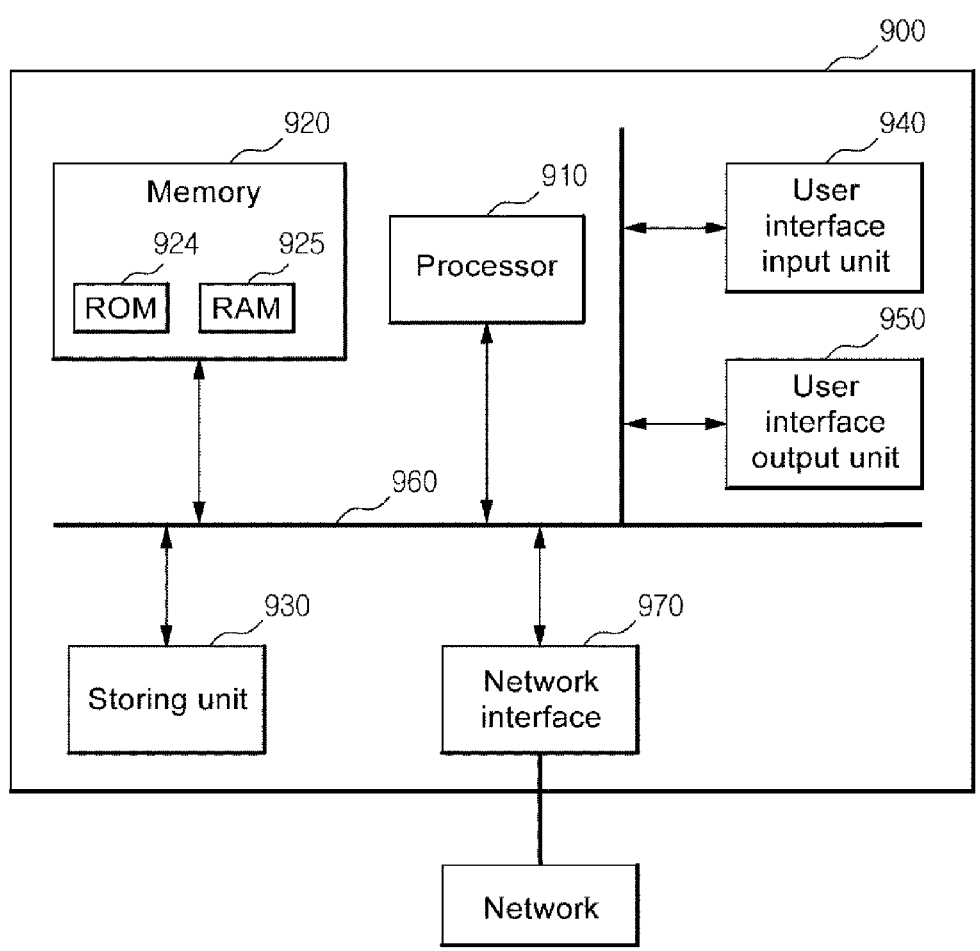
FIG. 9 is a diagram illustrating an example of a computer system in which an example of an apparatus for generating depth information is implemented.

Exemplary embodiments of the present disclosure may be implemented in a computer system, for example, a computer readable recording medium. As shown in FIG. 9, a computer system 900 may include at least one of at least one processor 910, a memory 920, a storing unit 930, a user interface input unit 940 and a user interface output unit 950. The computer system 900 may further include a network interface 970 to connect to a network. The processor 910 may be a CPU or semiconductor device which executes processing commands stored in the memory 920 and/or the storing unit 930. The memory 920 and the storing unit 930 may include various types of volatile/non-volatile storage media. For example, the memory may include ROM 924 and RAM 925.

Accordingly, the exemplary embodiment of the present disclosure can be implemented by the method which the computer is implemented or in non-volatile computer recording media stored in computer executable instructions. The instructions can perform the method according to at least one embodiment of the present disclosure when they are executed by a processor.

The computer readable medium may include a program instruction, a data file and a data structure or a combination of one or more of these.

The program instruction recorded in the computer readable medium may be specially designed for the present disclosure or generally known in the art to be available for use. Examples of the computer readable recording medium include a hardware device constructed to store and execute a program instruction, for example, magnetic media such as hard disks, floppy disks, and magnetic tapes, optical media such as CD-ROMs, and DVDs, and magneto-optical media such as floptical disks, read-only memories (ROMs), random access memories (RAMs), and flash memories. In addition, the above described medium may be a transmission medium such as light including a carrier wave transmitting a signal specifying a program instruction and a data structure, a metal line and a wave guide. The program instruction may include a machine code made by a compiler, and a high-level language executable by a computer through an interpreter. The above described hardware device may be constructed to operate as one or more software modules to perform the operation of the present disclosure, and vice versa.

What is claimed is:

1. An apparatus for generating depth information, comprising:
    an image downsizer configured to downsize, using a processor, an input stereo image by a predetermined magnification to generate a downsized stereo image;
    a rawcost calculator configured to calculate, using a processor, rawcosts of target pixels from the downsized stereo image;
    a mapper configured to map, using a processor, the rawcosts to the input stereo image;
    an interpolator configured to perform, using a processor, interpolation and cost aggregation for the rawcosts; and
    a depth information generator configured to calculate an optimal disparity for each pixel of the input stereo image by referring to the rawcosts and generate depth information corresponding to the optimal disparity, using a processor.

2. The apparatus of claim 1, wherein the rawcost calculator calculates the rawcosts of the target pixels using absolute difference, squared difference, or relative gradient between a target pixel of one side image of the downsized stereo image and a pixel within a disparity search range from a target pixel of another side image of the downsized stereo image.

3. The apparatus of claim 2, wherein the rawcost calculator updates a disparity search range for a next frame of each pixel to a range between a value obtained by subtracting a predetermined updated value of the optimal disparity from the optimal disparity for each pixel of the input stereo image and a value obtained by adding the predetermined updated value of the optimal disparity and the optimal disparity for each pixel of the input stereo image.

4. The apparatus of claim 2, wherein the rawcost calculator updates a predetermined cost for the pixels of the input stereo image to a maximum value among or an average of the rawcosts of the pixels of the input stereo image.

5. The apparatus of claim 1, wherein the image downsizer extracts a plurality of pixels by sampling the input stereo image and generates the downsized stereo image including the extracted pixels, and
    the mapper maps rawcosts of the pixels of the downsized stereo image to the sampled pixels of the input stereo image.

6. The apparatus of claim 1, wherein the interpolator performs interpolation between rawcosts of the pixels in a cost volume including the rawcosts mapped to the input stereo image; or
    interpolation between rawcosts of the pixels in the cost volume;
    interpolation between rawcosts corresponding to the same width and disparity in the cost volume; and
    interpolation between rawcosts corresponding to the same height and disparity in the cost volume.

7. The apparatus of claim 6, wherein the interpolator interpolates the rawcosts through linear interpolation or bicubic interpolation, and performs cost aggregation through a support weight filtering process for the interpolated rawcosts.

8. The apparatus of claim 7, wherein the interpolator performs the support weight filtering process twice.

9. The apparatus of claim 2, wherein the rawcost calculator determines rawcosts for pixels, which are not present within the disparity search range, among pixels present within a maximum disparity range corresponding to resolution from the target pixel of another side image, based on a predetermined cost.

10. A method for generating depth information in which an apparatus for generating depth information generates depth information, the method comprising:
    generating a downsized stereo image by downsizing an input stereo image by a predetermined magnification;
    calculating rawcosts of target pixels from for the downsized stereo image;
    mapping the rawcosts to the input stereo image;
    performing interpolation for the rawcosts;
    performing cost aggregation for the rawcosts;
    calculating optimal disparity for each pixel of the input stereo image by referring to the rawcosts; and
    generating depth information corresponding to the optimal disparity.

11. The method of claim 10, wherein the calculating rawcosts comprises:
    calculating the rawcosts of the target pixels using absolute difference, squared difference, or relative gradient of pixels within a disparity search range from a target pixel of one side image of the downsized stereo image and a target pixel of another side image of the downsized stereo image.

12. The method of claim 11, further comprising updating a disparity search range for a next frame of each pixel to a range between a value obtained by subtracting a predetermined updated value of the optimal disparity from the optimal disparity for each pixel of the input stereo image and a value obtained by adding the predetermined updated value of the optimal disparity and the optimal disparity for each pixel of the input stereo image.

13. The method of claim 11, further comprising updating a predetermined cost for the pixels of the input stereo image to a maximum value among or an average of the rawcosts of the pixels of the input stereo image.

14. The method of claim 10, wherein the generating a downsized stereo image by downsizing an input stereo image by a predetermined magnification comprises extracting a plurality of pixels by sampling the input stereo image and generating the downsized stereo image including the extracted pixels, and the mapping the rawcosts to the input stereo image comprises performing mapping rawcosts of the pixels of the downsized stereo image to the sampled pixels of input stereo image.

15. The method of claim 10, wherein the performing interpolation for the rawcosts comprises performing interpolation between rawcosts of the pixels in a cost volume including the rawcosts mapped to the input stereo image; or interpolation between rawcosts of the pixels in the cost volume;

interpolation between rawcosts corresponding to the same width and disparity in the cost volume; and interpolation between rawcosts corresponding to the same height and disparity in the cost volume.

16. The method of claim 15, wherein the performing interpolation for the rawcosts comprises interpolating the rawcosts through linear interpolation or bicubic interpolation, and the performing cost aggregation for the rawcosts comprises performing cost aggregation through a support weight filtering process for the interpolated rawcost.

17. The method of claim 16, wherein the performing cost aggregation for the rawcosts comprises performing the support weight filtering process twice.

18. The method of claim 11, wherein the calculating rawcosts further comprises determining rawcosts for pixels, which are not present within the disparity search range, among pixels present within a maximum disparity range corresponding to resolution from the target pixel of another side image, based on a predetermined cost.

\* \* \* \* \*